United States Patent [19]

Güurak et al.

[11] 4,303,569

[45] Dec. 1, 1981

[54] COAGULATION OF LATEX

[75] Inventors: Nur Güurak; Klaas Tebbens, both of Sarnia, Canada

[73] Assignee: Polysar Limited, Sarnia, Canada

[21] Appl. No.: 100,297

[22] Filed: Dec. 5, 1979

[30] Foreign Application Priority Data

Jul. 19, 1979 [CA] Canada .................................. 332147

[51] Int. Cl.$^3$ ................................................ C08J 3/16
[52] U.S. Cl. ........................... 260/29.7 PT; 260/821;
525/1; 525/3; 525/4; 526/310; 526/335;
526/338; 526/340; 526/342; 528/490; 528/501;
528/502
[58] Field of Search ........................ 260/29.7 PT, 821;
526/310, 335, 338, 340, 342; 525/1, 3, 4;
528/490, 501, 502

[56] References Cited

U.S. PATENT DOCUMENTS 2,366,460  1/1945  Semon .................................. 260/821

FOREIGN PATENT DOCUMENTS 686381  5/1964  Canada .

OTHER PUBLICATIONS

Chemical Abstracts, vol. 86 (1977), 91474x.
Synthetic Rubber, Whitby (1954), pp. 948–949.

*Primary Examiner*—Harold D. Anderson
*Attorney, Agent, or Firm*—Stevens, Davis, Miller & Mosher

[57] ABSTRACT

There is provided a process and apparatus for the coagulation of an aqueous latex of a polymer wherein the latex and an aqueous coagulant are mixed in a tubular coagulation means which is disposed at an angle of from about 20° up to 90° to the horizontal plane and the coagulated mixture is passed from the tubular coagulation means to a conduit equipped with an impingement plate and then to means for separation, recovery and drying of the coagulated polymer.

8 Claims, 5 Drawing Figures

COAGULATION OF LATEX

This invention relates to an improved apparatus and process for the coagulation of an aqueous latex of a polymer to produce particles of polymer which may be subjected to recovery and drying in a conventional manner.

Aqueous latices of polymers are well known. Such latices may be produced by the polymerization of suitable monomers in an aqueous free radical emulsion polymerization system. Latices have many applications for which the latex, per se, is necessary. The major proportion of rubbery polymers produced by aqueous free radical emulsion polymerization are required as dry rubber—this requires the recovery and drying of the polymer from the latex. Polymers are conventionally recovered from an aqueous latex thereof by contacting and mixing the latex with a suitable coagulant and the coagulated polymer is then separated, recovered and dried. Conventionally coagulation is achieved by supplying the latex, which may or may not have already been mixed with an agent to cause creaming, to a large tank and simultaneously supplying the coagulant to the tank and thoroughly mixing the contents of the tank for a long enough time to achieve complete coagulation. Such processes are described in the book by Whitby at pages 201 to 204 for styrene-butadiene rubbers, at page 803 for butadiene-acrylonitrile rubbers and at pages 948–949 for various German developments (Synthetic Rubber, G. S. Whitby, Editor, J. Wiley & Sons Inc.). German Patent No. 761,636 describes a process for precipitating polymer from an aqueous emulsion thereof by mixing the emulsion and a coagulant, immediately removing the precipated particles and subsequently mixing the precipitated particles with water, the precipitation being achieved in a vertical tower equipped with agitators. Canadian Patent No. 686,381 describes a process for the production of a strand of coagulated rubber by mixing in a nozzle a latex and an electrolyte solution and passing the mixture into a flow pipe under conditions of laminar flow.

We have now discovered an improved apparatus and process for the coagulation of an aqueous latex of a polymer by contact with an inorganic coagulant wherein said latex and said coagulant are mixed in a tubular coagulation means which is disposed at an angle of from about 20° to the horizontal plane up to 90° to the horizontal plane to cause complete coagulation such that the polymer may then be separated, recovered and dried.

In accordance with our invention, there is provided an improved process for the coagulation of an aqueous latex of a rubbery $C_4$–$C_6$ conjugated diolefin containing polymer which comprises contacting a stream of said latex with an aqueous stream of a coagulant solution and separating, recovering and drying the coagulated polymer, the improvement being that said latex and said coagulant solution are contacted in a tubular coagulation means at a temperature of from about 50° to about 80° C. for a time of from about 1 to about 30 seconds, a Reynolds Number of from about 7,000 to about 70,000 and a flow ratio, by weight, of coagulant solution to the polymer content of the latex of from about 150:1 to about 750:1, said tubular coagulation means being disposed at angle of from about 20° to the horizontal plane up to 90° to the horizontal plane.

Also in accordance with our invention, there is provided an apparatus for the coagulation of an aqueous latex of a rubbery $C_4$–$C_6$ conjugated diolefin containing polymer, which apparatus comprises
  pump means for supplying a stream of said latex,
  pump means for supplying at a temperature of from about 50° to about 80° C. a stream of an aqueous solution of an inorganic coagulant,
  a line from said pump means to feed latex to a tubular coagulation means,
  a line from said pump means to feed aqueous coagulant to said tubular coagulation means,
  a tubular coagulation means having a narrow diameter elongate form, the aqueous coagulant feed line being attached at or close to one terminal point, the latex feed line being attached at or close to said terminal point to one or more line located essentially centrally within said tubular coagulation means which line is of not more than about 25% of the cross sectional area of the tubular coagulation means and which terminates within said tubular coagulation means allowing the latex to pass into the aqueous coagulant at a point downstream of but closely adjacent to the point at which the aqueous coagulent feed line is attached,
  said tubular coagulation means terminating in essentially unrestricted form above and feeding into one end of a conduit inclined at a small angle from the horizontal sufficient to allow the coagulated mixture to flow down said conduit to the opposite end thereof where said conduit is equipped, at a distance from the end thereof of not more than 1.5 times the maximum diameter of said tubular coagulation means, with an impingement plate which the coagulated mixture contacts, mechanical separating means fed from said impingement plate of said conduit for separating coagulated polymer from the aqueous phase,
  and means for recovering, drying and packaging said coagulated polymer,
  said tubular coagulation means being sized such as to provide a residence time therein of from about 1 to about 30 seconds and a Reynolds Number of from about 7,000 to about 70,000, the weight flow ratio to said aqueous coagulant to the polymer content of said latex being from about 150:1 to about 750:1,
  and said tubular coagulation means being disposed at an angle of from about 20° to the horizontal plane up to 90° to the horizontal plane.

The latices which may be coagulated by the present process comprise the rubbery $C_4$–$C_6$ conjugated diolefin containing polymers. Such latices are well known in the art. Rubbery $C_4$–$C_6$ conjugated diolefin containing polymers include polybutadiene, butadiene-styrene and isoprene-styrene copolymers containing from about 40 to about 85 weight percent of butadiene or isoprene, butadiene-acrylonitrile and isoprene-acrylonitrile copolymers containing from about 50 to about 80 weight percent of butadiene or isoprene, butadiene or isoprene-alphamethyl styrene copolymers, butadiene or isoprene-methacrylonitrile copolymers and butadiene-styrene or butadiene-acrylonitrile copolymers containing small amounts of up to about 5 weight percent of one or more additional monomers such as divinyl benzene, glycidyl or hydroxyethyl acrylate or methacrylate, amine susbstituted acrylates or methacrylates such as dimethylaminoethyl methacrylate, acrylamide, mono- or difunctional unsaturated carboxylic acids and the like. Such polymers may be prepared by the well known aqueous free radical emulsion polymerization processes in which the emulsifiers are selected from one or more of the fatty acids, the rosin acids and the synthetic emulsifiers such as the naphthalene sulphonic acids and the like. The polymer content of such latices is generally from about 10 to about 35 weight percent, preferably from about 20 to about 30 weight percent.

Coagulants used in the present invention are also well known in the art and comprise the inorganic acids such as sulphuric and hydrochloric acid and aqueous solutions of inorganic electrolytes such as the alkali metal halides, the alkali earth metal halides and sulphates and alum. Preferred coagulants are sulphuric acid alone or together with sodium chloride especially for butadiene-styrene polymers and calcium chloride for butadiene-acrylonitrile polymers. Concentrations in water of such coagulants are well known in the art, for example, sulphuric acid being used at a convenient concentration to provide the necessary pH, sodium chloride being used as a 3 to 8 percent solution and calcium chloride being used as a 0.3 to 2 percent solution. Additional coagulation aids may be used as desired—such coagulation aids may include polyamine compounds, animal glue, casein, lignin and the like.

The latex and coagulant are contacted in the tubular coagulation means at a temperature of from about 50° to about 80° C., preferably from about 60° to about 80° C. The temperature of contact is most readily controlled by providing the necessary heat to the coagulant stream. In a batch process heat may be supplied, by direct addition of steam or by passage through a heat exchanger, to the coagulant stream before it is fed to the tubular coagulation means. In a continuous process heat may be supplied, by direct addition of steam or by passage through a heat exchanger, to the aqueous phase separated from the coagulated polymer on the mechanical separating means and the heated aqueous phase may then be recycled to the tubular coagulation means. A fresh supply of coagulant may be added, as necessary, to the recycled aqueous plase.

The residence time in the tubular coagulation means and calculated for the whole means is from about 1 to about 30 seconds, preferably from about 5 seconds to about 25 seconds. If the residence time is too short, complete coagulation will not occur and the aqueous phase separated by the mechanical separating means will contain polymeric material usually present as fine particles. If the residence time in the tubular coagulation means is too long, we have found that the polymer particles tend to agglomerate so that the coagulated polymer separated on the mechanical separating means consists of particles of a wide range of sizes.

The Reynolds Number in the tubular coagulation means is from about 7,000 to about 70,000. Reynolds Number is a well known term used to describe the motion of a fluid and thereby to describe the mixing occurring during the motion of a fluid. The Reynolds Number for a circular conduit is calculated from the equation Reynolds Number $= (Dv\rho/\mu)$ where D is pipe diameter in cms, v is the flow velocity in cm/sec., $\rho$ is the density of the fluid in g/cm$^3$ and $\mu$ is the viscosity in g/cm. sec. Preferably the Reynolds Number in the tubular coagulation means is from about 10,000 to about 50,000 and most preferably from about 10,000 to about 30,000.

The flow ratio, by weight, of the coagulant solution to the polymer content of the latex is from about 150:1 to about 750:1. The volume flow rate of the latex stream is generally significantly less than the volume flow rate of the coagulant stream. The concentration of the coagulant in the aqueous coagulant solution has some effect on its efficiency as a coagulating agent. The concentration of polymer in the latex has a significant effect on the amount of coagulant necessary to achieve coagulation—a dilute latex will generally require less coagulant than a more concentrated latex does. Hence the flow ratio is defined in terms of the weight ratio of the coagulant solution to the polymer content of the latex. A preferred flow ratio is from about 200:1 to about 600:1 and a most preferred flow ratio is from about 250:1 to about 400:1.

The tubular coagulation means is of narrow diameter elongate form and is disposed at angle of from about 20° to the horizontal plane up to 90° to the horizontal plane. Preferably the tubular coagulation means is disposed at an angle of from about 75° to the horizontal plane up to 90° to the horizontal plane and most preferably from about 85° up to 90° to the horizontal plane. The tubular coagulation means may also comprise one section disposed essentially vertically, that is at an angle of from about 85° up to 90° to the horizontal plane, an adjoining section disposed essentially horizontally and another adjoining section disposed essentially vertically. The tubular coagulation means may also comprise two sections of different cross-sectional area, a narrow cross-sectional area section being that to which the coagulant and latex feed lines are attached and a larger cross-sectional area section being downstream of the narrow section but otherwise integral therewith. The tubular coagulation means is preferably of essentially circular cross section. The tubular coagulation means may be described as a long narrow diameter pipe having at the one end lines for supply of coagulant and latex and being open at the other end. The tubular coagulation means terminates in an essentially unrestricted form, that is with an open end of cross-sectional area essentially the same as the cross sectional area of the tubular coagulation means.

The aqueous coagulant feed line is attached at or close to one terminal point of the tubular coagulation means. The coagulant feed line may be attached directly to the end of the coagulation means or may be attached to the side of the coagulation means at or close to the end thereof. The latex feed line is attached to the tubular coagulation means at or close to the same terminal point thereof as the coagulant feed line is attached. The latex feed line is attached to a line located essentially centrally within the tubular coagulation means, this line being of not more than about 25% of the cross-sectional area of the coagulation means and which terminates within the coagulation means at a point downstream of but closely adjacent to the point at which the aqueous coagulant feed line is attached thus allowing the latex to pass into and mix thoroughly with the aqueous coagulant. Preferably, this line is of about 5 to about 25% of the cross-sectional area of the coagulation means and most preferably of about 5 to about 15% of the cross-sectional area of the coagulation means. This line may terminate as an open end or may be equipped with a suitable dispersing type nozzle or a suitable distributor. Alternatively the latex feed line may be attached to a number of lines located within the tubular coagulation means to provide a number of points of entry for the latex into the coagulant stream.

The tubular coagulation means terminates above and feeding into one end of a conduit inclined at a small angle from the horizontal sufficient to allow the coagulated mixture to flow down the conduit to the opposite exit end thereof. The conduit is equipped at the exit end with an impingement plate which the coagulated mixture contacts, the impingement plate being located at a distance from the end of the conduit of not more than 1.5 times, and preferably from about 0.25 to about 0.75 times, the maximum diameter of the tubular coagulation means. The coagulated mixture flows from the open end of the tubular coagulation means into the one closed end of the conduit, down the conduit and into contact with the impingement plate and then falls by gravity downward onto the mechanical separating means. The conduit may be an essentially rectangular trough, having a bottom and two walls, a trough of approximately semi-circular cross-section or may be an essentially enclosed line with an opening for entry of the coagulated polymer and an opening for exiting flow of the coagulated polymer to contact the impingement plate. An open essentially rectangular trough is preferred.

The mechanical separating means separates the coagulated polymer from the aqueous phase, and is of the type well known in the art including, for example, a vibrating screen or a continuous moving screen belt. The aqueous phase is collected and preferably is recycled for re-use as coagulant. The separated coagulated polymer is optionally subjected to a water washing stage and then to a drying operation, such as squeezing and drying in a tunnel drier or extruder dewatering and extruder drying.

The polymers recovered by the process of the present invention may be used in applications well known for such materials, such as in seals and gaskets for butadieneacrylonitrile polymers and in tires for butadiene-styrene polymers.

In order to better understand the process and apparatus of the invention, reference is made to the Figures which describe specific embodiments of apparatus according to the invention.

Figure 1:
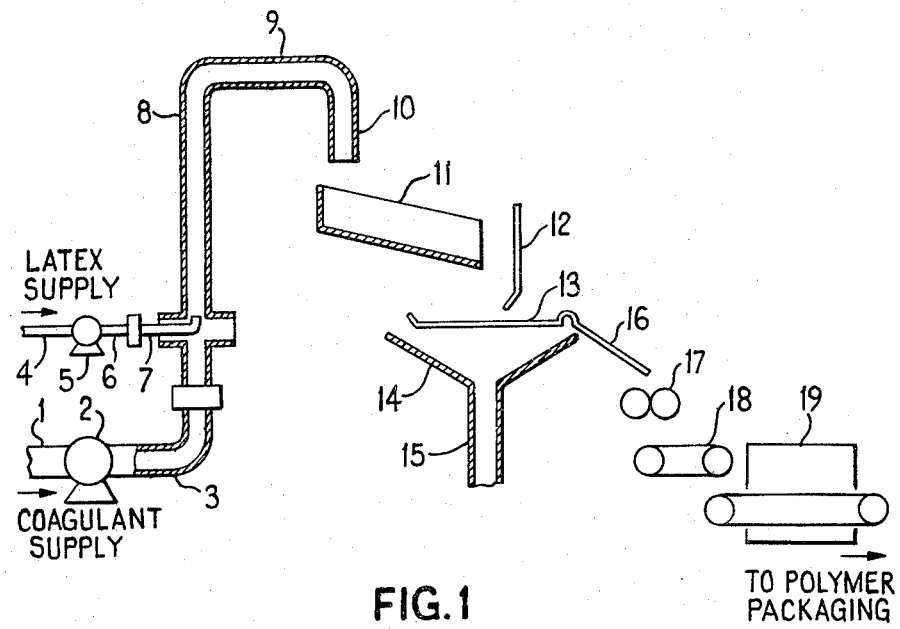
FIG. 1 is a schematic outline of apparatus for operation of the process according to the invention.

With reference to FIG. 1, aqueous coagulant from line 1 is passed by pump 2 to line 3 for feeding to the tubular coagulation means. Latex from line 4 is fed by pump 5 to line 6 which is connected to line 7 for feeding the latex into the tubular coagulation means. The tubular coagulation means comprises essentially vertical section 8, a short means and terminates downstream of the point at which the coagulant enters. The coagulated polymer from the outlet section of the coagulation means is fed onto conduit 41 which is essentially an open trough of square cross-section, inclined at an angle of about 20° to the horizontal, with an open end directed to impingement plate 42. The coagulated polymer-aqueous phase mixture falls from the impingement plate onto mechanical separating means 43 and the separated polymer is passed to dewatering extruder 51 and then to drier extruder 52. The dry polymer from the drier extruder is packaged. The separated aqueous phase is collected at collector 44, passes by line 45 to pump 46 into line 48. Fresh coagulant, as necessary, is supplied to line 48 from line 47. The aqueous phase is supplied to tank 49 which is equipped with line 50 for supply of steam for purposes of temperature control.

Figure 3:
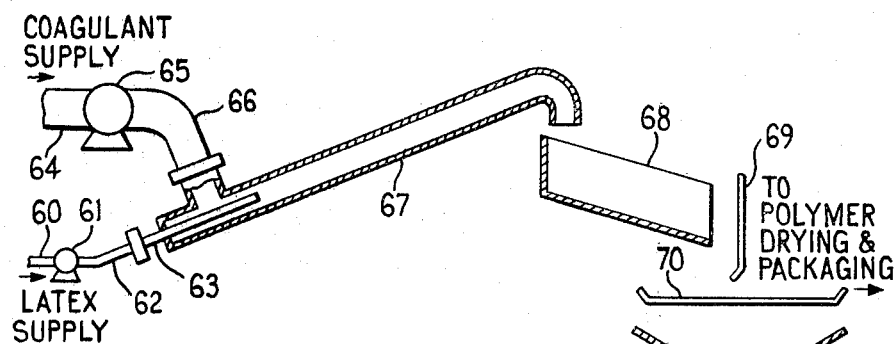
FIG. 3 is a schematic outline of a further alternative apparatus for operation of the process according to the invention.

In FIG. 3 there is shown a further alternative apparatus. Latex is fed by line 60 to pump 61 to line 62 which is attached to line 63 for feeding into the tubular coagulation means. Aqueous coagulant is fed by line 64 to pump 65 to line 66 which is attached to the tubular coagulation means. The tubular coagulation means 67 is a uniform diameter essentially circular cross-section pipe disposed at an angle of about 45° to the horizontal. Latex line 63 enters at an essentially central point of the closed end of the coagulation means and terminates within the coagulation means downstream of the point of entry of the coagulant. The open end of the coagulation means is directed downwardly onto conduit 48 whereby the coagulated mixture flows downward to contact impingement plate 69 and then to the vibrating screen separating means 70. The separated polymer is then dried and packaged and the aqueous phase is collected at 71 and directed into line 72 for re-use as coagulant or for disposal.

Figure 4:
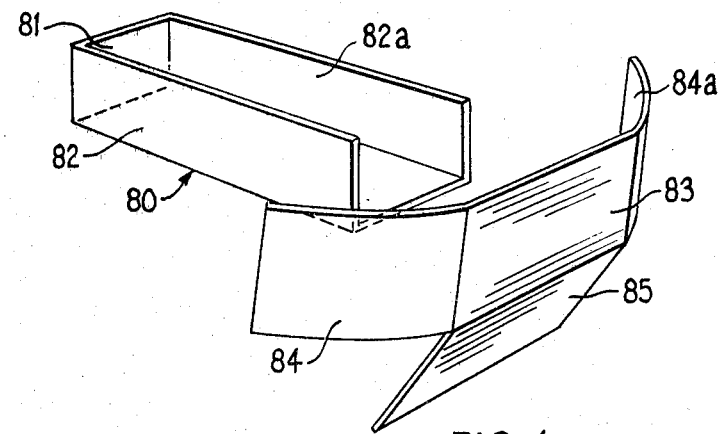
FIG. 4 is a schematic detail of a conduit for use in the apparatus of the invention.

FIG. 4 illustrates a conduit suitable for use in the present apparatus. The conduit 80 is an essentially square cross-section trough having one closed end 81 and two vertical sides 82 and 82a. Directly in front of the open end is impingement plate 83, shown as equipped with side wings 84 and 84a and a flow directing plate 85.

Figure 5:
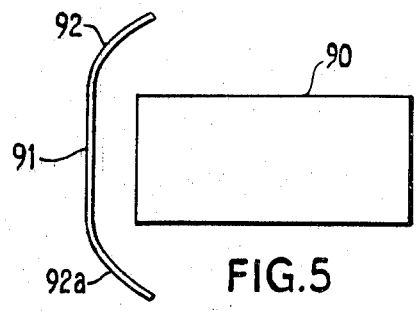
FIG. 5 is a schematic layout of the conduit of FIG. 3.

In FIG. 5 there is shown in outline a view from above of the conduit and impingement plate. The conduit 90 is located at a short distance from the impingement plate 91 and side wings 92 and 92a encompass the area to minimize loss of polymer particles. The distance between the impingement plate 91 and the conduit 90 is variable and is not more than 1.5 times the maximum diameter of the tubular coagulation means and is preferably from about 0.25 to about 0.75 times the maximum diameter of the tubular coagulation means.

Figure 2:
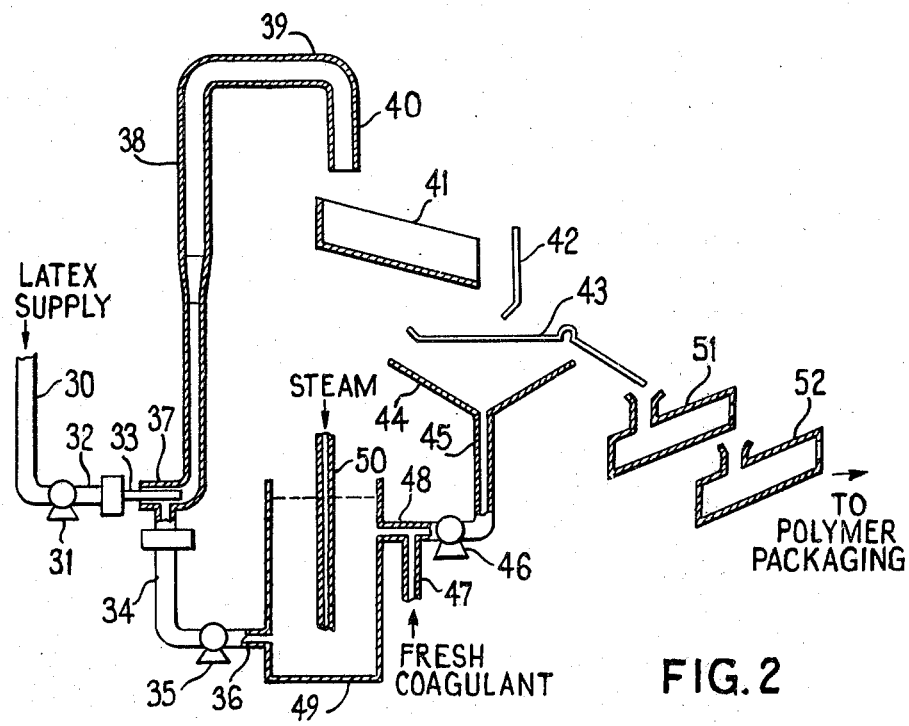
FIG. 2 is a schematic outline of alternative apparatus for operation of the process according to the invention.

For each of FIGS. 1, 2 and 3, the tubular coagulation means is preferably a circular cross-section pipe, the major length of which is preferably disposed in the essentially vertical plane, and sized according to the total flow rate and residence time desired. For example, for a pilot plant scale of operation, the latex line may be from about 0.3 to about 1.5 cm diameter pipe, the coagulant line may be from about 2 to about 7.5 cm pipe and the tubular coagulation means may be from about 2 to about 7.5 cm diameter pipe. A suitable length for the coagulation means may be readily determined knowing the diameter of the coagulation means, the approximate velocity flow of coagulant and latex and the approximate residence time required. The velocity flow must be such as to cause the Reynolds Number to be in the range specified.

In operation of the processes according to the apparatus of FIGS. 1, 2 and 3, it is preferable to maintain the temperature in the tubular coagulation means by providing heat to the coagulant stream, which can be readily achieved in a continuous operation by supplying the necessary heat to the recycle coagulant stream and in a batch operation by heating the coagulant stream before it is fed to the tubular means. Where it is necessary to control the pH in the coagulation system, such as for the coagulation of styrene-butadiene polymer, acid such as sulphuric acid may be added to the recycle coagulant stream or to the tubular coagulation means.

Further embodiments will be obvious to one of average skill in the art. The following examples serve to illustrate the process of the present invention. All parts are parts by weight and flow rates are kg/min.

EXAMPLE 1

The apparatus used was that shown in FIG. 1 except that the polymer recovered from the vibrating screen mechanical separator was dried in a laboratory scale hot air circulating oven. With reference to FIG. 1, the coagulant line 1 was of 2.5 cm diameter pipe and fed into pipe 3 which was of 7.5 cm diameter pipe. Latex line 4 was of 0.6 cm diameter and was fitted to line 7, also of 0.6 cm diameter, for feeding latex into the tubular coagulation means. The tubular coagulation means was 7.5 cm diameter pipe having a total length of about 290 cm, with about 150 cm being the vertical section 8, about 20 cm being the horizontal section 9 and about 120 cm being the vertical outlet section 10. The conduit 11 was of about 4 inch width with walls and end plate about 15 cm high. It was about 120 cm long and was inclined at an angle of about 20° to the horizontal. The impingement plate 12 was located about 2.5 cm from the end of the conduit and was of essentially the design shown in FIGS. 4 and 5. The latex used contained about 23 weight percent of a butadiene-acrylonitrile polymer having about 34 weight percent of bound acrylonitrile and a molecular weight measured as the Mooney (ML 1+4 at 100° C.) of about 50. The temperature in the tubular coagulation means was 63° C. and the coagulant was a 0.48 weight percent solution of calcium chloride in water. When the process had reached steady operating conditions, the latex flow rate was 0.5 kg/min. and the coagulant flow rate was 70 kg/min., the flow ratio of weight per minute of aqueous coagulant to polymer content of the latex was about 580:1, the residence time calculated for the tubular coagulation means was 10 seconds and the Reynolds Number was calculated to be 20,500, the residence time being calculated with the assumption that sections 8, 9 and 10 of the tubular coagulation means were full of fluid. The polymer was found to be of about 0.25 inch particles which did not stick to the equipment and could be dried readily. The recovered aqueous phase was found to be clear and did not contain any suspended matter.

EXAMPLE 2 (Control)

The apparatus and materials of Example 1 were used. The calcium chloride concentration was 0.52 weight percent and the temperature in the tubular coagulation means was 60° C. When steady operating conditions were achieved, the latex flow rate was 1 kg/min. and the coagulant flow rate was 27 kg/min. The residence time in the tubular coagulation means was calculated to be 25.5 seconds and the Reynolds Number was calculated to be 8,100. The ratio of the flow by weight of coagulant solution to the polymer content of the latex was 117:1. The polymer was obtained as a mixture of large and small particles and the recovered aqueous phase was found to be cloudy and to contain residual suspended matter indicating that the coagulation was not complete.

This example is outside the scope of the invention and illustrates the criticality of having a flow ratio by weight of coagulant solution to the polymer content of the latex of greater than 150:1.

EXAMPLE 3

The apparatus and materials of Example 1 were used except that the latex line 7 at its termination within the tubular coagulation means was fitted with a disperser nozzle which was made of about 0.3 cm closed end tubing coiled into one and a half turns and having 8 apertures of about 0.075 cm diameter distributed along the coils. The temperature in the tubular means was 54° C. and the calcium chloride concentration was 0.4 weight percent. Under steady operating conditions, the latex flow rate was 0.6 kg/min and the coagulant flow rate was 33 kg/min., the flow ratio of weight per minute of coagulant solution to the weight per minute of polymer in the latex was about 250:1, the residence time in the tubular coagulation means was 21 seconds and the Reynolds Number was calculated to be 9750. The polymer was recovered as uniformly sized particles and the aqueous phase was found to be clear.

EXAMPLE 4

The apparatus and materials of Example 3 were used with the only difference being in flow rates. At steady operating conditions, the latex flow rate was 0.6 kg/min. and the coagulant flow rate was 19.5 kg/cm. The ratio by weight of the flow of coagulant solution to the flow of polymer in the latex was about 150:1. The residence time in the tubular coagulation means was 35 seconds and the Reynolds Number was 5900. The polymer was obtained as agglomerated masses and the aqueous phase was found to be cloudy.

This example is outside the scope of the invention and illustrates the criticality of the combination of having the coagulant to polymer content of the latex flow ratio greater than about 150:1, of having a residence time of less than 30 seconds and of having a Reynolds Number of greater than 7,000 for successful operation of the process of the present invention.

EXAMPLE 5

The apparatus shown in FIG. 2 was used with the exception that the polymer separated on the vibrating screen 43 was dried in a laboratory scale hot air circulating oven. With reference to FIG. 2, the latex line 32 was 0.6 cm diameter pipe and the coagulant line 34 was 2.5 cm diameter pipe. Line 33 extended into Section 37 of the tubular coagulation means to a point just beyond where the coagulant line 34 was attached. The tubular coagulation means was of two portions of different diameter pipe—section 37 was of 2.5 cm diameter and was about 107 cm long with about 10 cm being essentially horizontal and about 97 cm being essentially vertical, the second portion being of 5 cm diameter pipe, section 38 being essentially vertical and being about 63.5 cm long, section 39 being essentially horizontal and about 38 cm long and the outlet section 40 being essentially vertical and about 89 cm long. The conduit and impingement plate was as described in Example 1. The latex used was that described in Example 1 and the coagulant was a 0.5 weight percent solution of calcium chloride in water. The temperature in the tubular coagulation means and tank 49 was 66° C. At steady operating conditions, the latex flow rate was 0.5 kg/min. and the coagulant flow rate was 33 kg/min. and the ratio of the weight of the flow of coagulant solution to the weight of flow of the polymer in the latex was 275:1. The residence time in the 2.5 cm diameter section of the tubular coagulation means was about 1 second and the calculated Reynolds Number was about 26,500 and the residence time in the 5 cm diameter portion of the tubular coagulation means was about 7 seconds and the Reynolds Number was 13,500 assuming the whole 5 cm diameter portion was full of fluid. The polymer was recovered as uniform particles of about 0.7 cm diameter and the aqueous phase was found to be clear.

In a second operation at steady conditions, the latex flow rate was 1.12 kg/min. and the coagulant flow rate was 72.7 kg/min., giving a ratio of the weight of flow of coagulant to the weight of flow of polymer in the latex of 270:1. The residence time in the 2.5 cm diameter section of the tubular coagulation means was 1 second and the Reynolds Number was calculated to be 16,000. For the 5 cm diameter portion of the tubular coagulation means and assuming the whole portion was full, the residence time was calculated to be 7.3 seconds and the Reynolds Number was calculated to be 8100.

EXAMPLE 6

The apparatus of Example 1 was used. The latex used contained 12.5 weight percent of a styrene-butadiene polymer which contained about 23.5 weight percent of styrene and had a Mooney (ML 1+4 at 100° C.) of about 51. The coagulant solution contained approximately 5 weight percent of sodium chloride, sufficient sulphuric acid to maintain the pH at 3.5 and a commercially available polyamine compound known as NALCO 107 (NALCO is a registered Trade Mark) at a concentration of about 0.1 weight percent based on the polymer in the latex. The temperature in the tubular coagulation means was 65° C. When steady operating conditions were achieved, the latex flow rate was 1.2 kg/min. and the coagulant flow rate was 57.3 kg/min., giving a ratio for the weight of flow of coagulant to the weight of flow of polymer in the latex of 380:1, the residence time and Reynolds Number for the tubular coagulation means were 27 seconds and 7700 respectively and the polymer was recovered as uniform size particles which dried readily.

What is claimed is:

1. An improved process for the coagulation of an aqueous latex of a rubbery $C_4$–$C_6$ conjugated diolefin-containing polymer which comprises contacting a stream of said latex with an aqueous stream of a coagulant solution and separating, recovering and drying the coagulated polymer, characterized in that the latex and coagulant solution are contacted in a tubular coagulation means at a temperature of from about 50° to about 80° C. for a time of from about 1 to about 30 seconds, a Reynolds Number of from about 7,000 to about 70,000 and a flow ratio, by weight, of coagulant solution to the polymer content of the latex of from about 150:1 to about 750:1, said tubular coagulation means being disposed at an angle of from about 20° up to about 90° to the horizontal plane and being of narrow diameter elongate form, having a coagulant solution feed line attached at or close to one terminal point, having a latex feed line attached at or close to said terminal point to one or more lines located essentially centrally within said tubular coagulation means, said one or more lines being of not more than about 25% of the cross-sectional area of the tubular coagulation means and terminating within said tubular coagulation means allowing the latex to pass into the coagulant solution at a point downstream of but closely adjacent to the point at which the coagulant solution feed line is attached, said tubular coagulation means terminating in essentially unrestricted form above and feeding into one end of a conduit inclined at a small angle from the horizontal sufficient to allow the coagulated mixture to flow down said conduit to the opposite exit end thereof where said conduit is equipped, at a distance from the end thereof of not more than 1.5 times the maximum diameter of said tubular coagulation means, with an impingement plate which the coagulated mixture contacts, following which the coagulated polymer is separated, recovered and dried.

2. The process of claim 1 characterized in that the aqueous latex contains from about 10 to about 35 weight percent of polymer and said polymer is polybutadiene, butadiene-styrene or isoprene-styrene polymers containing from about 40 to about 85 weight percent of butadiene or isoprene, butadiene-acrylonitrile or isoprene-acrylonitrile polymers containing from about 50 to about 80 weight percent of butadiene or isoprene, butadiene- or isoprene-alphamethylstyrene polymers, butadiene- or isoprene-methacrylonitrile polymers or butadiene-styrene or butadiene-acrylonitrile polymers containing up to about 5 weight percent of one or more additional monomers.

3. The process of claim 2 characterized in that the coagulant is an aqueous solution of sulphuric acid, hydrochloric acid, alkali metal halides, alkaline earth metal halides or sulphates or alum.

4. The process of claim 3 characterized in that the residence time in the tubular coagulation means is from about 5 to about 25 seconds.

5. The process of claim 3 characterized in that the Reynolds Number is from about 10,000 to about 50,000.

6. The process of claim 3 characterized in that the flow ratio is from about 200:1 to about 600:1.

7. The process of claim 3 characterized in that the polymer is a butadiene-styrene polymer and the coagulant is sulphuric acid or a sulphuric acid-sodium chloride mixture.

8. The process of claim 3 characterized in that the polymer is a butadiene-acrylonitrile polymer and the coagulant is calcium chloride.

* * * * *